(No Model.)
W. C. JONES & W. S. ROGERS.
GEARING.
No. 361,222. Patented Apr. 12, 1887.
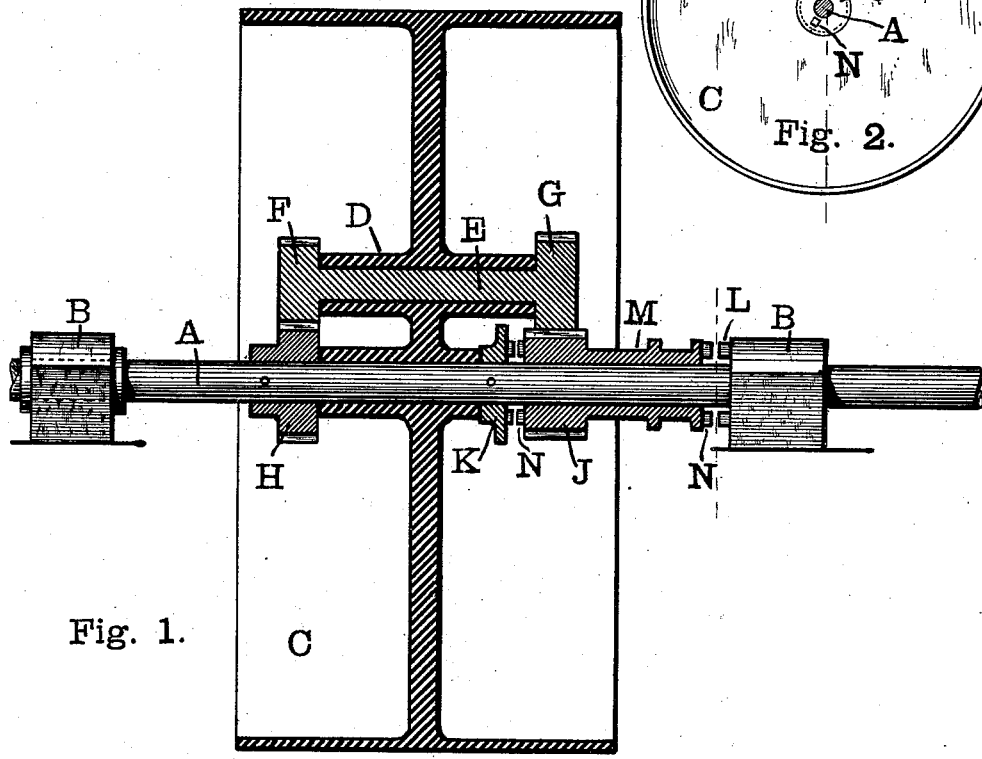
Fig. 2.
Fig. 1.
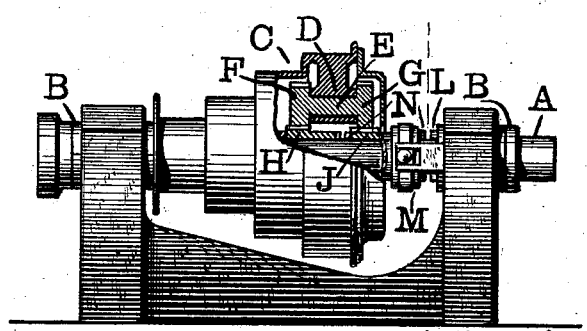
Fig. 3.
Witnesses:
Willis C. Jones
Winfield S. Rogers
Inventors
by James W. See
Attorney

UNITED STATES PATENT OFFICE.

WILLIS C. JONES AND WINFIELD S. ROGERS, OF HAMILTON, OHIO.

GEARING.

SPECIFICATION forming part of Letters Patent No. 361,222, dated April 12, 1887.

Application filed January 17, 1887. Serial No. 224,519. (No model.)

*To all whom it may concern:*

Be it known that we, WILLIS C. JONES and WINFIELD S. ROGERS, of Hamilton, Butler county, Ohio, have invented certain new and useful Improvements in Gearing, of which the following is a specification.

This invention pertains to gearing adapted for use in the transmission of rotary motion, and it relates to an arrangement by which a rotating shaft or pulley may have either its velocity or direction of motion instantly changed.

Our invention will be readily understood from the following description, taken in connection with the accompanying drawings, in which—

Figure 1 is a vertical section of a mechanism illustrating our improved gearing; Fig. 2, a face view of the same with the shaft in vertical transverse section, the view being reduced in scale; and Fig. 3, an elevation of a head-stock of a lathe, partly vertical section, illustrating an adaptation of our invention.

In the drawings, A indicates a shaft, hereinafter denominated the "main shaft;" B, journal-boxes supporting the same; C, a pulley fitted to revolve freely upon the main shaft; D, a journal-bearing carried by the pulley and disposed parallel with the axis of the pulley a short distance radially therefrom, this bearing being hereinafter referred to as the "planet-bearing;" E, a shaft fitted to revolve freely in the planet-bearing, and mentioned hereinafter as the "planet-shaft;" F, a pinion fast upon one end of the planet-shaft; G, a pinion fast upon the other end of the planet-shaft, these pinions being hereinafter denominated the "planet-pinions;" H, a pinion fast upon the main shaft and meshing with planet-pinion F, and hereinafter denominated the "shaft-pinion;" J, a pinion meshing with planet-pinion G and fitted to revolve freely upon the main shaft, and fitted also, preferably, to have a limited sliding motion upon the main shaft, this pinion being hereinafter denominated the "loose-pinion;" K, a clutch-collar fast upon the main shaft, and hereinafter denominated the "shaft-clutch;" L, a clutch fixed against rotation, such fixture being effected in the illustration by the clutch being attached to one of the journal-boxes B, this clutch being hereinafter denominated the "fixed clutch;" M, a sleeve projection from the loose pinion, the same being illustrated as provided with collars, by means of which a shifting-lever may serve in shifting the loose pinion endwise; and N, clutches upon each end of the loose pinion adapted to engage, respectively, the shaft-clutch and the fixed clutch.

Proposition one: Assume the loose pulley to be shifted to the left, thus clutching the loose pinion to the shaft-clutch, and assume that the main shaft is free to revolve in its bearings and that the pulley is being revolved by power. It will then be obvious that the pulley is simply locked to the shaft and that the shaft will revolve with the pulley in the same direction and at the same speed. The device, as thus far assumed, would present merely the aspect of a pulley fast upon a shaft.

Proposition two: Assume the planet-pinions to be of equal diameter, the main-shaft pinion and loose pinion to be of equal diameter, and assume the loose pinion to be shifted to the right, so its clutch engages the fixed clutch, and assume, as before, that the main shaft is free to revolve in its bearings, and that the pulley is being revolved by power. Then it is obvious that the loose pinion cannot revolve; that during the revolution of the pulley the planet-pinion G, in revolving about the loose pinion, will be revolved upon its axis; that the planet-pinion F, revolving with the planet-pinion G, will revolve in a similar manner about the shaft-pinion H, and that, consequently, the pulley will revolve without imparting rotation to the shaft. The device, as thus far assumed, would present merely the aspect of a pulley revolving freely upon a shaft.

Proposition three: Assume, now, that the pulley is held stationary by any means; that the main shaft is free to revolve in its bearings; that the loose pinion is free from either clutch; that the loose pinion J has a diameter represented by one; that the planet-pinion G has a diameter represented by two; that planet-pinion F has a diameter represented by one, and that shaft-pinion H has a diameter represented by two. Then, if the loose pinion M be turned by the hand one revolution, the planet-pinions will be given one half-revolution and the shaft-pinion H and the shaft will be given one quarter-revolution. The gearing has served to transmit rotary motion from the pinion M to the main shaft at a rate of speed according to the proportioning of the pinions.

Proposition four: Assume, now, that the loose pinion be shifted to the right, so as to be held against rotation by the fixed clutch, assume the pinions to be of the proportions just noted, and assume the main shaft free to revolve in its bearings and the pulley to be revolved by power. Then, as the pulley revolves, the planet-pinion G will have rotation imparted to it at a speed due to the proportioning of pinions G and J, modified by the planetary revolution. The planet-pinion F will transmit rotary motion to the shaft-pinion H and to the shaft at a speed due to the proportioning of these pinions, modified by the planetary revolution. It appeared from proposition three, in which the gearing was equal, or unmodifying as to velocities, that the pulley would revolve freely without imparting motion of the shaft; but, under the present conditions, the pitch-line of planet-pinion F will have a less speed of travel than the pitch-line of pinion G. Consequently the planet-pinion F, while revolving about the shaft-pinion H, will drag the latter pinion forward in revolution; hence the device presents the aspect of a revolving pulley driving a shaft in the same direction at a lower rate of speed.

Proposition five: Assume the conditions and proportions of proposition four, but that the loose pinion is shifted to the left to clutch with the shaft-clutch K. Then, as in proposition one, the shaft will revolve with the pulley in the same direction and at the same rate of speed.

*Practical application to change of velocity without change of direction.*—In the lathe illustrated in Fig. 3 the pulley C takes the form of the ordinary cone-pulley of a lathe, and a suitable lever serves in shifting the loose pinion. With the loose pinion shifted to the left, the lathe-spindle revolves at the speed of the cone and in the same direction. The cone is shown as having four steps, and, consequently, eight changes of speed are available. The cone-diameters and the proportion of pinions may be so arranged as to yield a proper gradation of the eight speeds, from the fastest to the slowest. Our improved gearing in such an application takes the place of the usual back gearing and furnishes a cheaper and more readily-adjusted substitute.

Proposition six: Assume pinion J to have a diameter represented by two, planet-pinion G to have a diameter represented by one, planet-pinion F to have a diameter represented by two, and shaft-pinion H to have a diameter represented by one. Assume the shaft free to revolve in its bearing and the pulley to be revolved by power. Then the pitch-line of planet-pinion F will have a higher rate of speed than the pitch-line of planet-pinion G, and planet-pinion F in revolving about the shaft H, instead of dragging that pinion forward in revolution, as in proposition four, will urge that pinion backward in revolution, thus causing the main shaft to revolve in a direction opposite to that in which the pulley revolves, and at a speed due to the proportioning of the pinions, modified by the planetary revolution.

*Practical application of reversal of direction of motion.*—In the lathe illustrated in Fig. 3, with the pinions proportioned as in proposition six, when the loose pinion is shifted to the left the lathe-spindle will revolve with the cone and at the speed of the cone. When the loose pinion is shifted to the right, the lathe-spindle will revolve in a direction opposite to that of the cone and at a speed due to the proportioning of the gearing. Our improved gearing thus takes the place of the reversing counter-shaft employed in screw-cutting lathes, and furnishes a cheaper and more readily-adjusted substitute.

It must be obvious, without demonstration, that power may be applied for the rotation of the shaft and our improved gearing utilized in modifying the direction or velocity of rotation of the pulley. It must be obvious that the pulley may be a toothed gear, in case motion is to be transmitted through gearing instead of through belting. It must be obvious that friction-clutches may be substituted for the lug-clutches shown in the drawings, such clutches being well-known equivalents of each other. It must be obvious that the entire object of shifting the loose pinion endwise is to enable that pinion to be clutched alternatively to the shaft, so as to revolve with it, or to the fixed clutch, in order to be held against rotation, and that any other well-known means permitting this result would be the equivalent of the sliding of the pinion. As an illustration, the pinion might not slide and the clutches K and L might slide into engagement with the pinion. The office of the clutches is to furnish locks to be used alternatively in locking the loose pinion either to the shaft or against rotation.

We claim as our invention—

1. A shaft fitted for rotation, a pulley fitted to revolve freely upon said shaft and provided with a planet-bearing, a planet-shaft journaled in said bearing and provided with a planet-pinion fast upon each end, a pinion fast to the shaft and meshing with one of said planet-pinions, a pinion fitted to revolve loosely upon the shaft and engaging the other of said planet-pinions, and two clutches adapted alternatively to lock said pinion to said shaft and to lock said pinion against rotation, combined and arranged for operation substantially as set forth.

2. A shaft fitted for rotation, a pulley fitted to revolve freely upon said shaft and provided with a planet-bearing, a planet-shaft journaled in said bearing and provided a planet-pinion fast upon each end, a pinion fast to the shaft and engaging one of said planet-pinions, a clutch fixed to the shaft, a fixed clutch on the shaft, and a pinion fitted to slide and rotate upon said shaft and engaging the other of said planet-pinions, and having clutches adapted for engagement with the before-mentioned clutches, combined and arranged for operation substantially as set forth.

3. A shaft fitted for rotation, a cone-pulley fitted for rotation on said shaft and provided with a planet-bearing, a planet-shaft journaled in said bearing and provided with a planet-pinion fixed to each end, a pinion fixed to the shaft and engaging one of said planet-pinions, a clutch fixed to the shaft, a fixed clutch upon the shaft, and a pinion fitted to rotate and slide upon said shaft and engaging the other of said planet-pinions, and provided with clutches adapted to engage the before-mentioned clutches, combined and arranged for operation substantially as set forth.

WILLIS C. JONES.
WINFIELD S. ROGERS.

Witnesses:
J. W. SEE,
W. A. SEWARD.